(12) United States Patent
Kakutani

(10) Patent No.: US 9,148,547 B2
(45) Date of Patent: Sep. 29, 2015

(54) PRINTING APPARATUS, PRINTING METHOD, AND IMAGE PROCESSING APPARATUS

(71) Applicant: SEIKO EPSON CORPORATION, Tokyo (JP)

(72) Inventor: Toshiaki Kakutani, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/295,736

(22) Filed: Jun. 4, 2014

(65) Prior Publication Data

US 2014/0362415 A1 Dec. 11, 2014

(30) Foreign Application Priority Data

Jun. 5, 2013 (JP) ................. 2013-118608

(51) Int. Cl.
*H04N 1/405* (2006.01)
(52) U.S. Cl.
CPC ................... *H04N 1/4053* (2013.01)
(58) Field of Classification Search
None
See application file for complete search history.

(56) References Cited

U.S. PATENT DOCUMENTS

| | | | |
|---|---|---|---|
| 5,553,166 A | 9/1996 | Kakutani | |
| 7,369,710 B2 * | 5/2008 | Yoshida | 382/252 |
| 7,474,443 B2 * | 1/2009 | Mizutani et al. | 358/3.03 |
| 7,532,364 B2 * | 5/2009 | Miyagi et al. | 358/3.13 |
| 7,965,419 B2 | 6/2011 | Kakutani | |
| 8,406,295 B2 * | 3/2013 | Ishikawa | 375/240.03 |
| 8,416,457 B2 * | 4/2013 | Kakutani | 358/3.03 |
| 8,681,378 B2 * | 3/2014 | Kakutani | 358/1.9 |
| 8,736,865 B2 * | 5/2014 | Yamaguchi et al. | 358/1.14 |
| 8,773,721 B2 * | 7/2014 | Yasutomi | 358/3.06 |
| 2006/0228035 A1 * | 10/2006 | Ishikawa | 382/252 |
| 2007/0013953 A1 * | 1/2007 | Yamamoto | 358/3.13 |
| 2009/0086227 A1 * | 4/2009 | Nagai | 358/1.9 |
| 2011/0063684 A1 * | 3/2011 | Kakutani | 358/3.03 |
| 2011/0222125 A1 * | 9/2011 | Yasutomi et al. | 358/3.06 |
| 2012/0243012 A1 * | 9/2012 | Kakutani | 358/1.9 |
| 2012/0243013 A1 * | 9/2012 | Kakutani | 358/1.9 |

FOREIGN PATENT DOCUMENTS

| | | |
|---|---|---|
| EP | 1798951 A1 | 6/2007 |
| JP | 3360391 B2 | 12/2002 |
| JP | 2007-015359 A | 1/2007 |
| JP | 2007-166622 A | 6/2007 |
| JP | 2011-066594 A | 3/2011 |
| JP | 2011-120134 A | 6/2011 |
| JP | 2012-204967 A | 10/2012 |
| JP | 2012-204968 A | 10/2012 |

* cited by examiner

*Primary Examiner* — Dung Tran
(74) *Attorney, Agent, or Firm* — Global IP Counselors, LLP

(57) ABSTRACT

The printing apparatus includes a comparator, a threshold setting section, and an error diffusion section. The comparator compares a first threshold which is aligned with a dither mask and the image data. The threshold setting section sets a second threshold which is used in the error diffusion method to one of a low threshold and a high threshold according to results of the comparing, and sets the low threshold to a value which is smaller than a gradation range of the image data in at least a low gradation area when it is determined that the image data exceeds the first threshold. The error diffusion section generates the dot data and to calculate distribution to pixels in the vicinity of gradation errors by comparing correction data where error distribution in the image data is complete using the error diffusion method and the low threshold or the high threshold.

7 Claims, 9 Drawing Sheets

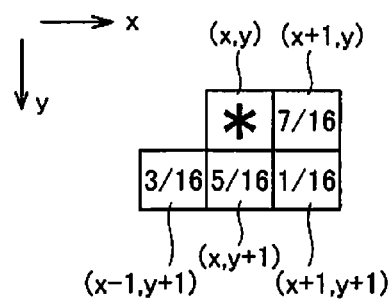
Fig. 7
Fig. 8A Fig. 8B Fig. 8C Fig. 8D
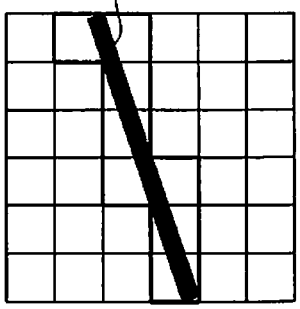

PRINTING APPARATUS, PRINTING METHOD, AND IMAGE PROCESSING APPARATUS

CROSS-REFERENCE TO RELATED APPLICATIONS

This application claims priority to Japanese Patent Application No. 2013-118608 filed on Jun. 5, 2013. The entire disclosure of Japanese Patent Application No. 2013-118608 is hereby incorporated herein by reference.

BACKGROUND

1. Technical Field

The present invention relates to a technique for processing an image using image data and to a technique for printing an image.

2. Related Art

As a halftone process where image data with numerous gradations is printed using dot data with a smaller number of gradations, there are known an error diffusion method where density errors are distributed in pixels in the vicinity in a case of converting the number of gradations, an ordered dither method where dot data is generated using a dither mask where threshold arrangement is carried out with excellent dispersibility, and the like. In a case of using a dither mask where a blue noise characteristic is applied or using a Bayer dither mask, the dispersibility of dot arrangement is excellent and the reproducibility of an image is superior with where data with comparatively few changes in gradation has a two dimensional spread. In addition, the ordered dither method has an advantage in that it is possible to control forming of dots by applying a specific characteristic to the arrangement of thresholds in the dither mask.

For example, in a method which is illustrated in Japanese Unexamined Patent Application Publication No. 2007-15359 described later, by independently creating a dither mask which is used in determining the forming of dots during forward movement and a dither mask which is used in determining the forming of dots during backward movement in a case where bidirectional printing is performed and applying a blue noise characteristic to each of the dither masks, printing is possible with little reduction in image quality with regard to deviation in positions for forming dots which are the printing positions in both dither masks.

SUMMARY

However, there is a problem in that reproducing line drawings such as fine lines which are drawn with low density data is unstable in a method where dot data is generated using a dither mask even with the ordered dither method. Fine lines with low density data are expressed by arranging dots at appropriate intervals, but when a blue noise mask is applied to the image data where there are fine lines, there is a phenomenon where lines are broken due to the dot intervals not being equally spaced and the dot intervals having large gaps in places. On the other hand, when a dither mask which has a regular pattern such as a Bayer dither is applied, a phenomenon is observed where the dot intervals considerably change according to the angle and position of the line drawings. In particular, in a case where the lines do not pass through pixel positions which correspond to low thresholds which are regularly arranged in the dither mask, there are problems in that dots which correspond to the lines are hardly formed and the lines disappear. These problems are particularly remarkable when reproducing CAD data which is based on line drawings.

On the other hand, in a case where the error diffusion method is used, it is possible to obtain comparatively better dot rows with regard to the line drawings by adjusting the values of the thresholds to values which correspond to the image data and correcting the range of the error diffusion as shown in Japanese Patent No. 3360391. Therefore, a method is considered where the error diffusion method is applied in a low gradation area where reduction in reproducibility of fine lines is a problem, and the dither method of Japanese Unexamined Patent Application Publication No. 2007-15359 or the like is applied in medium or high gradation areas where reduction in image quality or the like due to deviation of the positions for forming dots is a problem. A method of switching smoothly between halftone methods which are different in this manner is realized in Japanese Unexamined Patent Application Publication No. 2011-66594 described above. This method is extremely effective, but there is a problem in that it is not possible to achieve both of the advantages of error diffusion and the advantages of the dither method in the same gradation regions. In particular, not only will one or both of the advantages be insufficient in gradation areas where switching from the error diffusion method to the dither method is carried out, but there is a problem in that graininess may deteriorate due to disturbance in the dot dispersibility coming from interference in the two methods.

Although various types of halftone methods are proposed in the prior art, a method where a line drawing is stably reproduced while taking advantage of the ordered dither method where it is possible to impart various characteristics to the dot data is yet to be found as described above. In addition, in the image processing and printing in the prior art, there is also a desire to reduce the size of the apparatuses, reduce the cost, save resources, increase ease of manufacturing, improve usability, and the like.

The present invention is created in order to solve at least some of the problems described above and it is possible to realize the present invention as the following aspects.

(1) As one aspect of the present invention, there is provided a printing apparatus which prints an image based on image data. It is possible for the printing apparatus to be provided with an input section where the image data is input, a halftone processing section which generates dot data which represents whether or not dots are formed by processing the image data using an error diffusion method, and a print section which performs printing of the image using the dot data which is generated. Here, the halftone processing section may be provided with a comparator which compares a first threshold which is aligned with a dither mask and the image data which is input, a threshold setting section which sets a second threshold which is used in the error diffusion method to one of a low threshold and a high threshold whose values are different to each other according to results of the comparing and which sets the low threshold to a value which is smaller than a gradation range of the image data in at least a low gradation area in a case where it is determined that the image data exceeds the first threshold, and an error diffusion section which generates the dot data and which calculates distribution to the pixels in the vicinity of gradation errors, which are generated as a result of generating the dot data, by comparing correction data where error distribution in the image data is complete using the error diffusion method and the low threshold or the high threshold which are set.

In the printing apparatus, since a value which is smaller than the gradation range of the image data is set as the low threshold in at least a low gradation area, the possibility, that the result of determining using the first threshold will result in the error diffusion without any changes, is extremely high in a case where it is determined that the image data exceeds the first threshold. As a result, the following are realized:

(A) in a case where the necessary and sufficient dots are generated by the determination using the first threshold which is aligned with the dither mask, it is rare that extra dots are generated in the determination with the error diffusion method even when, for example, a value close to the threshold which is used in normal error diffusion is set to a high threshold, and it is possible to obtain output which is substantially dither compatible, and (B) in a case where the dots which are generated by the determination using the first threshold which is aligned with the dither mask are insufficient, the error diffusion method comes to forefront and dots are generated in a form which compensates for this.

The case of (B) mainly occurs at fine lines and edges. When fine lines with low gradation are reproduced using the dither method, there are cases where the line drawings are broken due to the dot intervals being spaced more than necessary as described in the section about the problems. In the present invention, in a portion where such dot generation is insufficient, dots are generated at appropriate intervals by the work of the error diffusion method which is superior in reproducibility of fine lines. As a result, according to the printing apparatus of this aspect, it is possible to reproduce images which take advantage of characteristics of the dither mask in relation to other images with superior reproducibility of fine lines and the like.

(2) In such a printing apparatus, the image data may be values equal to or more than 0 which have a gradation range of at least n bits (where n is an integer of 4 or more), the low threshold may be a value of less than 0 in at least a predetermined range which is a low gradation area, and the high threshold may be a value within the gradation range.

(3) In such a printing apparatus, the predetermined range may be a low gradation area which includes at least a portion of a range of 13/256 to 26/256 on the low area side with regard to the gradation range. The reason that the reproduction of fine lines is a problem is the low gradation area. Here, the notation of 13/256 with regard to the gradation value range expresses the gradation range using a plurality of bits, and this has the meaning that, for example, a value where the gradation value is divided by the maximum gradation value is 13/256 in a case where the gradation range is expressed as 256 gradations which are 0 to 255. When the image data is expressed using 16 bits (0 to 4095), a range of 16/256 or less is equivalent to a range of 0 to 255. Below, in the present specification, the notation is used regardless of how many bits are used to express the image data.

(4) In such a printing apparatus, the low threshold and the high threshold outside the low gradation area may each be set as values according to the image data, and the low threshold and the high threshold may be set to the same value in at least a range where the image data is equal to or more than 192/256 with regard to the gradation range. In the printing apparatus, it is possible to realize substantially error diffusion compatible characteristics at a gradation value of 192/255 or more.

(5) In such a printing apparatus, the error diffusion section may generate the dot data as data where the dots are formed without performing the setting of the low threshold or the comparing in a case where it is determined that the image data exceeds a first threshold as a result of the comparing using the comparator.

In the printing apparatus, since the dots are formed when the gradation position of the image data exceeds the first threshold, the dots are formed at positions in accordance with the characteristics of the dither mask. At that time, for example, when the dots which correspond to fine lines are not sufficiently formed using the relationship with the threshold of the dither mask, dots are formed according to the error diffusion method. As a result, it is possible to appropriately form dots which correspond to line drawings and natural images without determining the type of image.

(6) As another aspect of the present invention, there is provided a printing method where an image is printed based on image data. This printing method includes inputting the image data; setting a second threshold which is used in the error diffusion method to one of a low threshold and a high threshold whose values are different to each other by comparing a first threshold which is aligned with a dither mask and the image data and setting the low threshold to a value which is smaller than a gradation range of the image data in at least a low gradation area in a case where it is determined that the image data exceeds the first threshold when dot data which represents whether or not dots are formed is generated from the image data by performing a halftone process according to the error diffusion method, and generating the dot data and calculating distribution of the pixels in the vicinity of gradation errors, which are generated as a result of generating the dot data, by comparing correction data where error distribution in the image data is complete using the error diffusion method and the low threshold or the high threshold which are set; and performing printing of the image using the dot data which is generated.

According to the printing method, since a value which is smaller than the gradation range of the image data is set as the low threshold in at least a low gradation area, the possibility that the result of determining using the first threshold will result in the error diffusion without any changes is extremely high in a case where it is determined that the image data exceeds the first threshold. Accordingly, it is possible to appropriately form dots in the same manner as the printing apparatus of (1).

(7) In addition, as yet another aspect of the present invention, there is provided an image processing apparatus which generates dot data which represents whether or not dots are formed by processing image data which represents a predetermined image. The image processing apparatus is provided with an input section where the image data is input and a halftone processing section which generates dot data which represents whether or not dots are formed by processing the image data using an error diffusion method, where the halftone processing section is provided with a comparator which compares a first threshold which is aligned with a dither mask and the image data which is input, a threshold setting section which sets a second threshold which is used in the error diffusion method to one of a low threshold and a high threshold whose values are different to each other according to results of the comparing, and which sets the low threshold to a value which is smaller than a gradation range of the image data in at least a low gradation area in a case where it is determined that the image data exceeds the first threshold, and an error diffusion section which generates the dot data and which calculates distribution to the pixels in the vicinity of gradation errors, which are generated as a result of generating the dot data, by comparing correction data where error distribution in the image data is complete using the error diffusion method and the low threshold or the high threshold which are set.

According to the image processing apparatus, since a value which is smaller than the gradation range of the image data is set as the low threshold in at least a low gradation area, the possibility, that the result of determining using the first threshold will result in the error diffusion without any changes, is extremely high in a case where it is determined that the image data exceeds the first threshold. As a result, it is possible to generate the dot data by appropriately processing the image data.

(8) As another aspect of the present invention, there is provided an image data processing apparatus which generates dot data for printing by image data being input. The image data processing apparatus is provided with a first halftone processing section which generates provisional dot data which provisionally determines whether or not dots are formed by comparing with various thresholds of a dither mask which contains a plurality of thresholds, and a second halftone processing section which determines that dots are formed without any changes in a case where the provisional dot data indicates a result where it is determined that the dots are formed, and which determines whether or not dots are formed by applying an error diffusion method to the image data in a case where the provisional dot data indicates a result where it is determined that that dots are not formed.

In a case where the image data processing apparatus determines that the image data exceeds the first threshold, the result of determining in the first halftone processing section which uses the dither mask is a result of the error diffusion without any changes, and it is possible to determine whether or not dots are formed by applying the error diffusion method in a case where the image data does not exceed the first threshold. Accordingly, in a case where there is a tendency for the determining of whether or not dots are formed using the dither method to result in insufficient dots, the dot data is generated so as to compensate the dots using the error diffusion method.

Not all of the plurality of constituent components of each of the aspects of the present invention described above are essential, and it is possible to change, remove, or replace some of the constituent components of the plurality of constituent components with new and different constituent components, or remove some of the limited content of the constituent components of the plurality of constituent components as appropriate in order to solve some or all of the problems described above or in order to achieve some or all of the effects which are described in the present specification. In addition, in order to solve some or all of the problems described above or in order to achieve some or all of the effects which are described in the present specification, it is possible for some or all of the technical characteristics which are included in one aspect of the present invention described above to be an independent aspect of the present invention by being combined with some or all of the technical characteristics which are included in other aspects of the present invention described above.

It is also possible for the present invention to be realized in various aspects other than a printing apparatus or an image data processing apparatus. For example, it is possible to realize a method for manufacturing a printing apparatus or a method for controlling a printing apparatus in a format such as a computer program for realizing the control method or a permanent recording medium where the computer program is recorded.

BRIEF DESCRIPTION OF THE DRAWINGS

Referring now to the attached drawings which form a part of this original disclosure:

FIG. 7 is an explanatory diagram illustrating an example of an error diffusion range.

FIGS. 8A to 8D are explanatory diagrams illustrating examples of displaying fine lines in a case where the first embodiment is applied.

DETAILED DESCRIPTION OF EXEMPLARY EMBODIMENTS

A. First Embodiment

A first embodiment of the present invention will be described.

A-1. Apparatus Configuration

Figure 1:
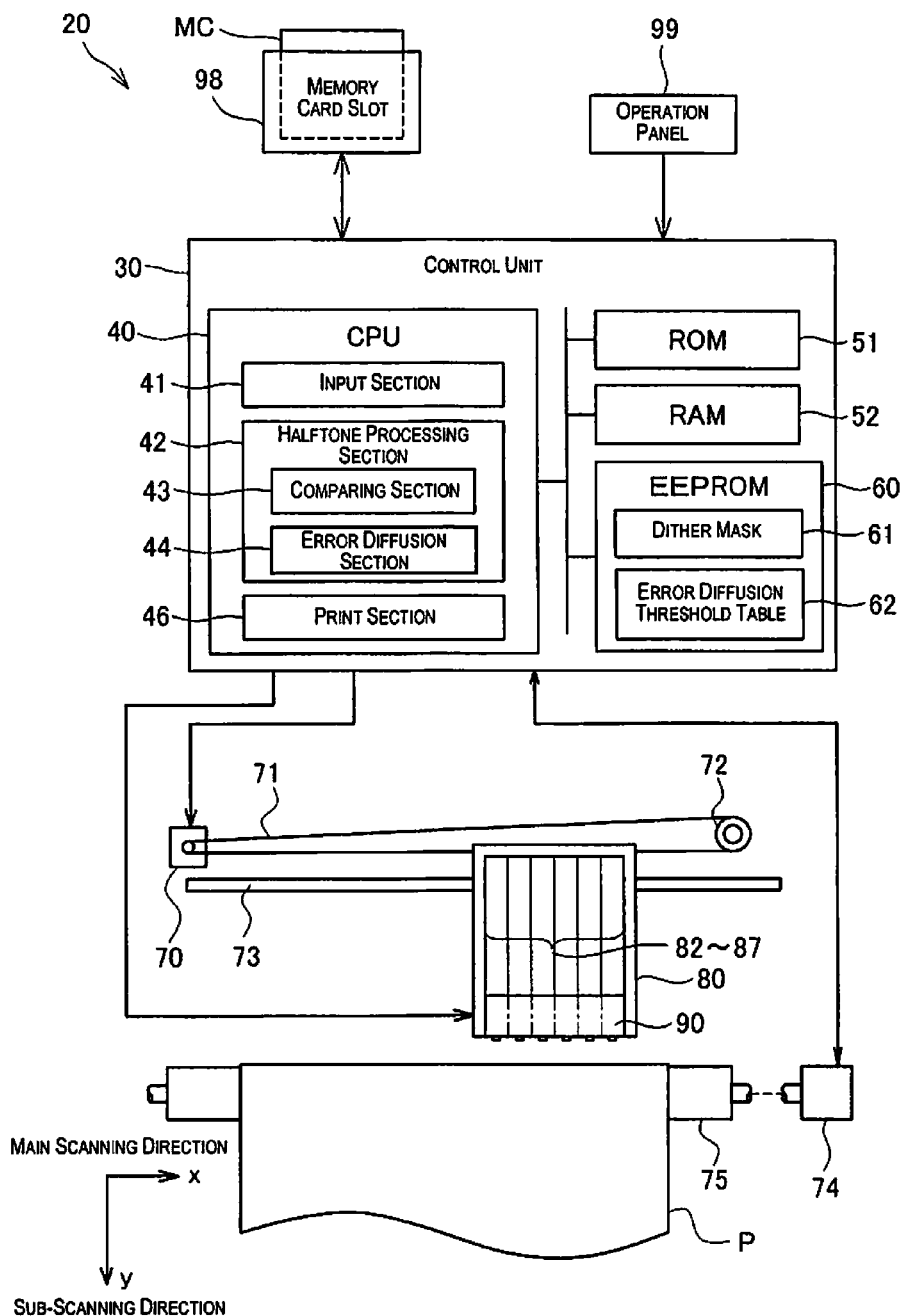
FIG. 1 is a schematic configuration diagram illustrating an image processing apparatus which is an embodiment.

FIG. 1 is a schematic configuration diagram of a printer 20 which is the first embodiment of a printing apparatus of the present invention. The printer 20 is a serial ink jet printer which performs bidirectional printing, and the printer 20 is configured by a mechanism which transports a print medium P using a sheet feeding motor 74, a mechanism which moves a carriage 80 back and forth in the axial direction of a platen 75 using a carriage motor 70, a mechanism where discharging of ink and forming of dots are performed by driving a print head 90 which is mounted in the carriage 80, and a control unit 30 which governs the exchange of signals between the sheet feeding motor 74, the carriage motor 70, the print head 90, and an operation panel 99, as shown in the diagram.

The mechanism which moves the carriage 80 back and forth in the axial direction of the platen 75 is configured from a sliding shaft 73 which extends in parallel with the axis of the platen 75 and which holds the carriage 80 so that the carriage 80 is able to slide, a pulley 72 which is provided to stretch an endless driving belt 71 between the pulley 72 and the carriage motor 70, and the like.

The carriage 80 is mounted with ink cartridges 82 to 87 for color inks where each of cyan ink C, magenta ink M, yellow ink Y, black ink K, light cyan ink Lc, and light magenta ink Lm are stored as color inks. Nozzle rows which correspond to color inks of each of the colors described above are formed in the print head 90 in the lower section of the carriage 80. When the ink cartridges 82 to 87 are mounted into the carriage 80 from above, it is possible to supply ink from each of the cartridges to the print head 90.

The control unit 30 is configured by connecting a CPU 40, a ROM 51, a RAM 52, and an EEPROM 60 to one another using a bus. The control unit 30 also functions as an input section 41, a halftone processing section 42, and a print section 46 in addition to controlling the overall operations of the printer 20 by programs which are stored in the ROM 51 or the EEPROM 60 being loaded into and executed by the RAM 52. The functions of the halftone processing section 42 include functions as a comparing section 43 and an error diffusion section 44. The details of these functional sections will be described later with reference to the flow charts of FIG. 2 and FIG. 3.

Figure 4:
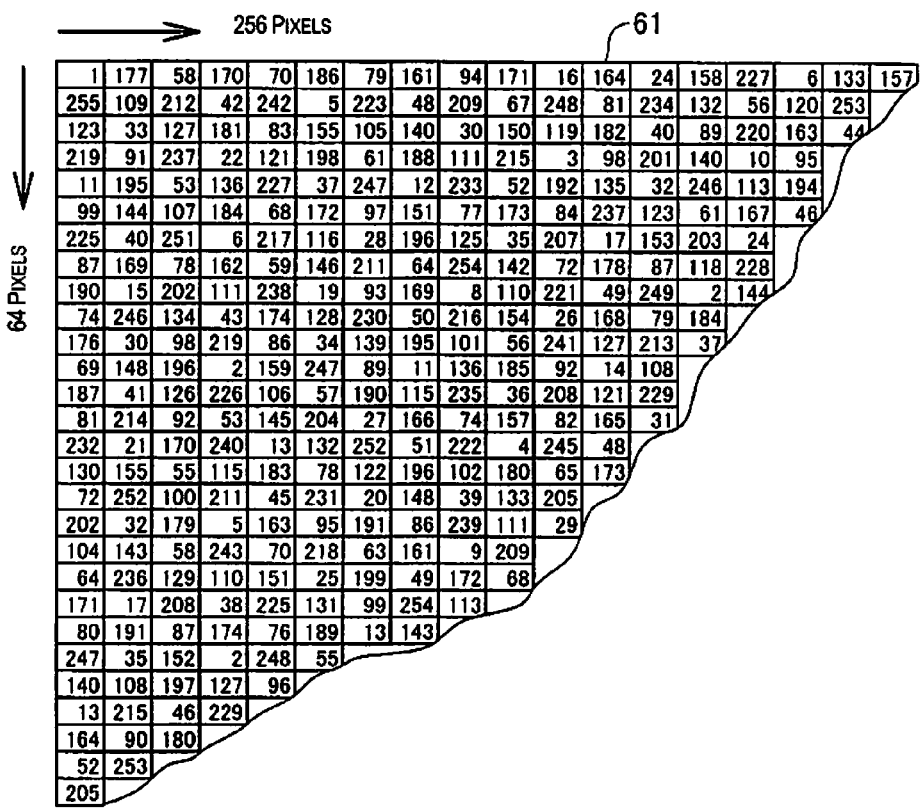
FIG. 4 is an explanatory diagram exemplifying a dither mask 61 which is used in an embodiment.

A dither mask 61 and an error diffusion threshold table 62 are stored in the EEPROM 60. The dither mask 61 is used in a halftone process which will be described later and has a size of 256 horizontally (in the main scanning direction) by 64 vertically (in the sub-scanning direction) as exemplified in a portion of FIG. 4. A plurality of thresholds $THn\_d$ which are equivalent to a first threshold are aligned in the dither mask 61. The first threshold $THn\_d$ (which is simply referred to below as threshold $THn\_d$) is a value of 1 to 255 in the present embodiment. Each of the thresholds $THn\_d$ is arranged such that the spatial frequency of the dots which are formed using a comparison with the threshold is a so-called blue noise characteristic.

Figure 5:
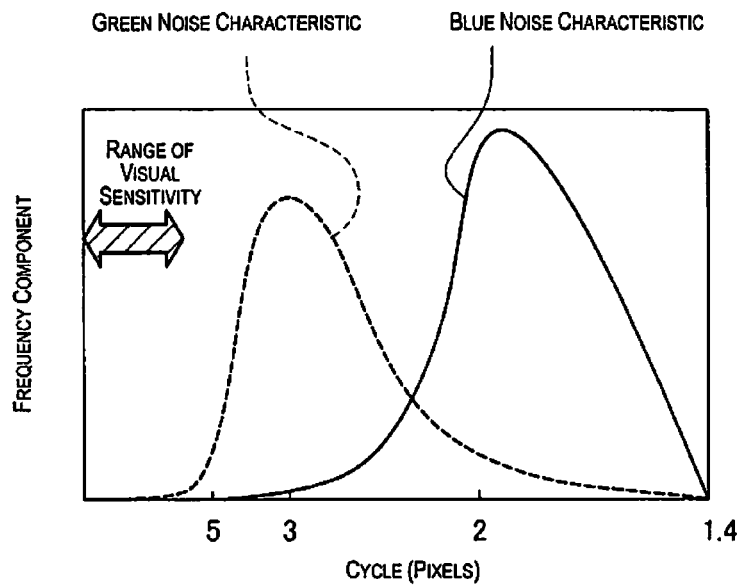
FIG. 5 is an explanatory diagram exemplifying noise characteristics which are provided in the dither mask 61 which is used in an embodiment.

FIG. 5 is an explanatory diagram exemplifying noise characteristics which are provided in the dither mask 61. The spatial frequency characteristics of the threshold, which are set for each of the pixels of the dither mask which has a blue noise characteristic and a green noise characteristic, are conceptually exemplified in the diagram. The blue noise characteristic in the dither mask has the largest spatial component in a high frequency region where the length of one cycle is close to 2 pixels. This has the meaning that the storage positions of the thresholds are adjusted such that the largest frequency components are generated in the high frequency region in consideration of characteristics of human sight where sensitivity is low in the high frequency region. It is possible to obtain an image with superior dot dispersibility when dots are generated using the dither mask which is provided with the blue noise characteristic in this manner.

The green noise characteristic is also exemplified in FIG. 5 as a dashed curved line. As shown in the diagram, the green noise characteristic has the largest frequency component at a side where the frequency is slightly lower than the blue noise characteristic, and it is possible to obtain an excellent image where a sense of graininess is not perceived even with the green noise characteristic when the pixel size is sufficiently small. The dither mask 61 has predetermined spatial frequency characteristics such as the blue noise characteristic and the green noise characteristic.

Furthermore, the dither mask 61 has a predetermined characteristic for forming dots in the present embodiment. That is, a dot pattern of a dot group which is formed by forward movement of the carriage 80 in bidirectional printing, a dot pattern of a dot group which is formed by backward movement of the carriage 80 in bidirectional printing, and any dot pattern of all the dot groups which are a combination of these all have the blue noise characteristic. Such techniques are described in, for example, Japanese Unexamined Patent Application Publication No. 2007-15359 and Japanese Unexamined Patent Application Publication No. 2007-15359. Here, the dither mask 61 may be provided with the blue noise characteristic for each main scanning group which indicates whether dots are formed in any main scanning out of a plurality of times of main scanning of the carriage 80 in addition to or instead of for each group of back and forth movement described above.

Here, in a case where the spatial frequency of the dots has the blue noise characteristic or the green noise characteristic, the dots which are formed have excellent dispersibility. Alternatively, it is also possible to determine whether dispersibility of the dots is excellent in a case where each of the spatial frequency distributions of the thresholds of the dither mask, which is set for pixels which belong to each of the plurality of groups, and the spatial frequency distribution of the print image have a positive correlation coefficient with each other, desirably, a correlation coefficient of equal to or more than 0.7.

The error diffusion threshold table 62 which is stored in the EEPROM 60 is a table for storing the second threshold which is used in determining ON/OFF of the dots in the error diffusion method. In the present embodiment, the second threshold includes a low threshold THe-L and a high threshold THe-H whose values are different. The value and the role of the second threshold will be described in detail later.

The control unit 30 is connected with a memory card slot 98 and it is possible to read in and input image data ORG from a memory card MC which is inserted in the memory card slot 98. In the present embodiment, the image data ORG which is input from the memory card MC is data which is formed from color components of the three colors of red (R), green (G), and blue (B).

The printer 20 which has the hardware configuration described above moves the print head 90 back and forth in the main scanning direction with regard to the print medium P by driving the carriage motor 70 and also moves the print medium P in the sub-scanning direction by driving the sheet feeding motor 74. The control unit 30 forms ink dots of appropriate colors at appropriate positions on the print medium P by driving the nozzles at an appropriate timing based on the print data by combining movement of the back and forth movement of the carriage 80 (in the main scanning) and movement of the sheet feeding of the print medium (in the sub-scanning). By doing so, it is possible for the printer 20 to print color images which are input from the memory card MC onto the print medium P.

A-2. Printing Process

Figure 2:
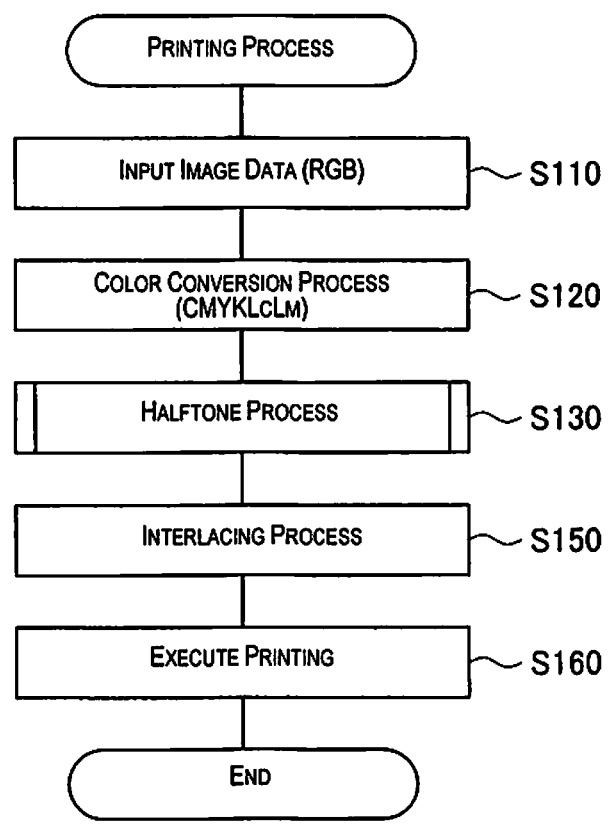
FIG. 2 is a flow chart illustrating a flow of a printing process of a printer 20.

A printing process of the printer 20 will be described. FIG. 2 is a flow chart illustrating a flow of a printing process of the printer 20. Here, the printing process is started by the user performing an operation of instructing a predetermined image, which is stored in the memory card MC, to be printed using the operation panel 99 and the like. When the printing process starts, the CPU 40 initially reads in and inputs the image data ORG, which is the print target in RGB format, from the memory card MC via the memory card slot 98 as the process of the input section 41 (step S110).

When the image data ORG is input, the CPU 40 color converts the RGB format of the image data ORG to a CMYKLcLm format by referring to a look up table (which is not shown in the diagram) which is stored in the EEPROM 60 (step S120).

When the color conversion process is performed, the CPU 40 performs a halftone process where the image data is converted to dot data where ON/OFF of the dots of each of the colors is determined for each of the pixels as the process of the halftone processing section 42 (step S130). The details of the halftone process described here will be described later. Here, in the present specification, the "halftone process" has a general meaning of gradation number conversion (reduction) processes which include multi-level processing such as ON/OFF of large and small dots, large, medium, and small dots, or the like without being limited to a binarization process of ON/OFF of dots. In addition, the image data which is subjected to step S130 may be image data where image processing such as a resolution conversion process or a smoothing process is carried out.

When the halftone process is performed, the CPU 40 performs an interlacing process where the image data is rearranged into dot pattern data which is to be printed in a single main scanning unit in accordance with the nozzle arrangement of the printer 20, the sheet feeding amount, and the like (step S150). When the interlacing process is performed, the CPU 40 executes printing by driving the print head 90, the carriage motor 70, the motor 74, and the like as the processes of the print section 46 (step S160).

A-3. Details of Halftone Process

The details of the halftone process (step S130) described above will be described using FIG. 3. As shown in the diagram, when the process is started, the CPU 40 initially acquires coordinate data n(x, y) of the target pixel position and target pixel data Dn for the image data where the color conversion process is performed in step S120 (step S131). The target pixel position is moved one pixel at a time in the main scanning direction (x direction) each time the following process is repeated starting from the origin point (the upper left) of the image. When the target pixel position reaches the right edge of the image in the main scanning direction, the pixel position is moved once in the sub-scanning direction (y direction) and is moved once again from the left edge in the x direction in the main scanning direction. In the following description, the coordinate data of the target pixel position is represented as n(x, y), but the coordinate data will be written directly as (x, y) when using subscript which indicates the target pixel position.

When the coordinate data n(x, y) of the target pixel position and the target pixel data Dn are acquired, the CPU 40 performs a provisional dither process as the process of the comparing section 43 (step S132). Here, the provisional dither process is a process of comparing the magnitude relationship of the gradation value of the target pixel data Dn and the value of the first threshold THn_d which corresponds to the coordinates (x, y) of the target pixel from out of the plurality of thresholds which configure the dither mask 61 which is stored in the EEPROM 60. This process is a process which has the same format as the process of determining ON/OFF of the dots using a dither method which is normally performed. In most cases, it is determined that the dots are ON in a case where the gradation value of the target pixel data Dn is equal to or more than the value of the first threshold THn_d and it is determined that the dots are OFF in a case where the gradation value of the target pixel data Dn is less than the value of the threshold THn_d in normal dither methods, but the provisional dither method of the present embodiment is different in the point that the provisional dither method is a pre-process for determining ON/OFF of the dots using the error diffusion method which will be described later, in detail, a process for determining the thresholds of the error diffusion method.

As a result of the provisional dither process, if the gradation value of the target pixel data Dn is equal to or more than the value of the threshold THn_d (step S132: YES), the second threshold THe which is used in the error diffusion method is set to the low threshold THe_L (step S133). On the other hand, if the gradation value of the target pixel data Dn is less than the value of the threshold THn_d (step S132: NO), the second threshold THe which is used in the error diffusion method is set to the high threshold THe_H (step S134). In this manner, there is a configuration in the present embodiment where the second threshold THe (may be simply referred to below as the threshold THe) which is used in the error diffusion method changes based on the results of the provisional dither process. The setting of the threshold THe is performed by referring to the error diffusion threshold table 62 which is stored in the EEPROM 60.

Figure 6:
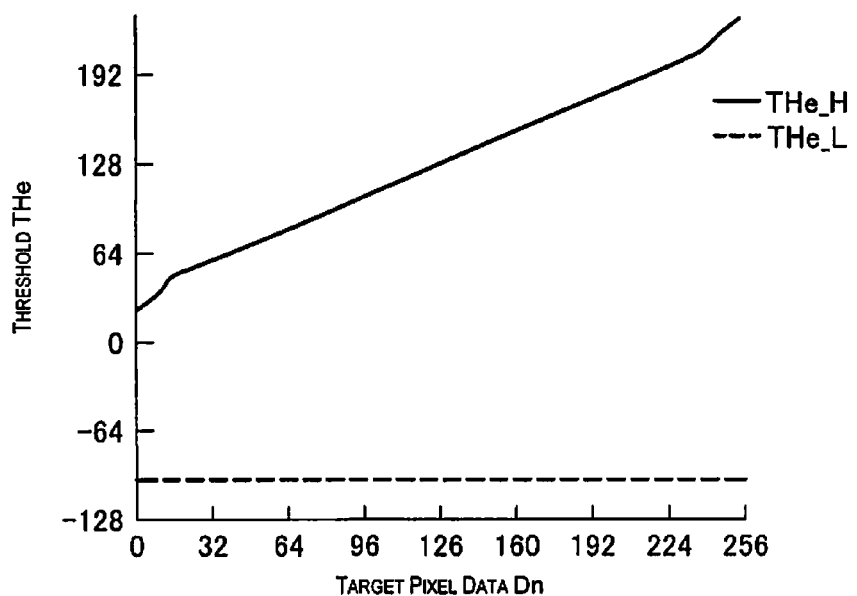
FIG. 6 is a graph illustrating a relationship between a high area side threshold THe_H, a low area side threshold THe_L, and target pixel data Dn in the first embodiment.

An example of the error diffusion threshold table 62 is shown in FIG. 6 as a graph. As shown in the diagram, the target pixel data Dn (here, 0 to 255) and the low threshold THe_L and the high threshold THe_H correspond with each other in the error diffusion threshold table 62. In the example shown in FIG. 6, the high threshold THe_H is a value of approximately 30 in a case where the gradation value of the target pixel data Dn is 0, the high threshold THe_H increases as the gradation value increases from 0 to eventually reach a value of approximately 240 in a case where the gradation value is 255. The low threshold THe_L is fixed at −100, which is a value which is smaller than the value 0 which is the lower limit of the gradation range (0 to 255) of focus pixel data, regardless of the size of the gradation value of the target pixel data Dn. The CPU 40 acquires the high threshold THe_H or the low threshold THe_L by referring to the error diffusion threshold table 62 and uses the high threshold THe_H or the low threshold THe_L in the setting in step S133 or S134. There is a configuration in the present embodiment where the high threshold THe_H and the low threshold THe_L are set according to the gradation value by referring to the error diffusion threshold table 62, but the high threshold THe_H and the low threshold THe_L may be determined using a function.

Figure 3:
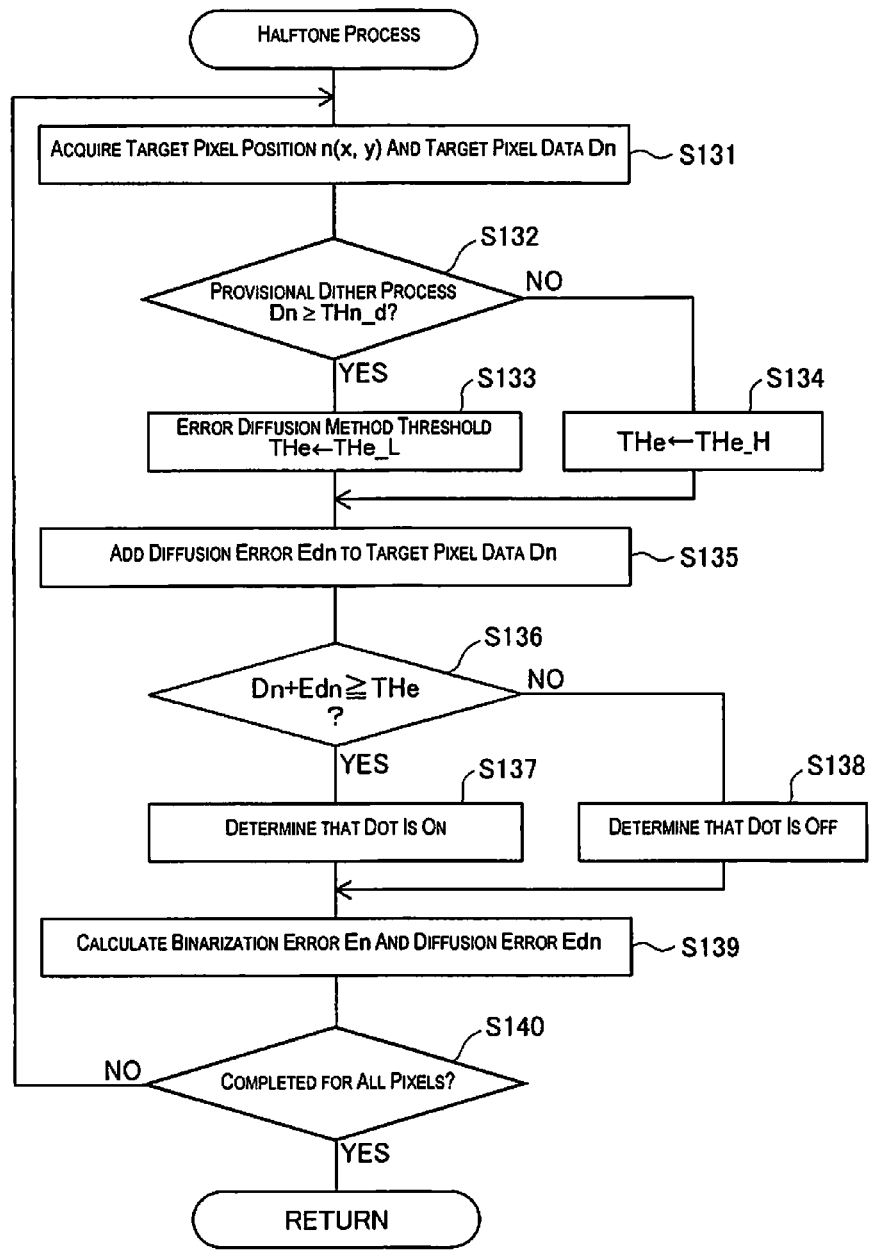
FIG. 3 is a flow chart exemplifying a halftone process in a first embodiment.

In step S137 or S138 of FIG. 3 described above, when the threshold THe is set by referring to the error diffusion threshold table 62, the CPU 40 adds a diffused error Edn, which is stored in an error buffer which is prepared separately, to the gradation value of the target pixel data Dn (step S135). The diffused error Edn is calculated in step S139 described later, and the contents of this will be described later.

When the error diffusion Edn is added to the gradation value of the target pixel data Dn, the CPU 40 compares the gradation value of the target pixel data Dn where the diffused error Edn is added (which may be referred to below as correction data) and the threshold THe which is set in step S133 or step S134 (step S136). As a result, if the correction data (Dn+Edn) is equal to or more than the threshold THe (step S136: YES), the dot of the target pixel is determined as ON (a dot is formed) (step S137), and if the gradation value of the target pixel data Dn where the diffused error Edn is added is less than the threshold THe (step S136: NO), the dot of the target pixel is determined as OFF (a dot is not formed) (step S138).

When ON/OFF of the dots is determined, the CPU 40 calculates a binarization error En and the diffused error Edn (step S139). The binarization error En is the difference between the correction data and a gradation value RSLT (here, a value of 255 or 0) which is realized as a result of ON/OFF of the dots. When expressed as a formula, the binarization error En may be expressed by the following formula (I).

$$En = \{Dn(x,y) + Edn(x,y)\} - RSLT(255 \text{ or } 0) \quad (1)$$

Typically, the binarization error En is a positive value when dots are not formed and is a negative value when dots are formed.

As a result, due to the process of the error diffusion which will be described later, it is difficult for dots to be formed in the pixels when dots are formed in the vicinity thereof and it is easy for dots to be formed in the pixels when the dots are not formed in the vicinity thereof due to the process of binarization. The error diffusion is a process where errors which are generated in the focus pixels are distributed in the pixels in the vicinity by determining the diffused error Edn according to the following formula (2). The errors which are distributed are accumulated and added to the gradation value of the target pixel data Dn in step S135 described above. In the present embodiment, the binarization error En is distributed to four pixels which are pixels in the vicinity where ON/OFF of the dots is not yet determined as shown in FIG. 7. That is, distribution is carried out as the diffused error Edn at a ratio of 7/16 with regard to the pixel to the right of the target pixel, 3/16 with regard to the pixel to the lower left of the target pixel, 5/16 with regard to the pixel below the target pixel, and 1/16 with regard to the pixel to the lower right of the target pixel. The diffused error Edn which is calculated in this manner is stored in the error buffer which is prepared in the RAM 52.

$$Edn(x+1,Y)=Edn(x+1,y)+En\times(7/16)$$

$$Edn(x-1,Y+1)=Edn(x-1,y+1)+En\times(3/16)$$

$$Edn(x,Y+1)=Edn(x,y+1)+En\times(5/16)$$

$$Edn(x+1,Y+1)=Edn(x+1,y+1)+En\times(1/16) \quad (2)$$

The processes of steps S135 to S139 are a halftone process using the error diffusion method and are executed as a process of the error diffusion section 44. Since the error diffusion method is a well-known technique, detailed description will be omitted, but the error diffusion method is a method where each piece of image data is quantized by comparing each piece of image data with a predetermined threshold while adding a quantization error of each piece of image data at a predetermined distribution ratio to the surrounding image data. In the example described above, steps S135 to S139 are a binarization process where only ON/OFF of the dots is determined, but a multi-level process may be performed such as where ON/OFF of large dots and small dots is determined.

When the binarization error En and the diffused error Edn are calculated, the CPU 40 determines whether the processes described above are completed for all of the pixels (step S140) and repeats the processes of step S131 to S139 described above while incrementing the target pixel position (x, y) until the processes for all of the pixels are complete. In this manner, the halftone processing of step S130 is finished.

The principles of the halftone processing will be described later. As described above, in the processes of step S132 to S134, the threshold THe which is used in the error diffusion method is set to the low threshold THe_L when the gradation value of the target pixel data Dn is equal to or more than the value of the threshold THn_d, and the threshold THe is set to the high threshold THe-H when the gradation value of the target pixel data Dn is less than the value of the threshold THn_d.

Here, the low threshold THe_L is set to a negative value which is −100 regardless of the gradation value of the target pixel data Dn. Accordingly, when the target pixel data Dn is provisionally less than the first threshold THn_d in step S132, the determining in step S136 is a result where it is determined that Dn+Edn THe_L is satisfied and that the dot is ON (that dots are formed) with a high probability of close to 100%. Moreover, the high threshold THe_H in the present embodiment is set to a value which is close to the ideal threshold which is given in Japanese Patent No. 3360391. As a result, the determining in step S136 is "YES" and it is possible to form the dots when the accumulation of errors from the pixels in the vicinity is a positive value even in a case where it is determined that dots are not formed using the provisional dither process.

This point will be described in more detail. FIGS. 8A to 8D are explanatory diagrams which describe forming of fine lines. FIG. 8A illustrates a case where a line segment SL which is slightly inclined from being vertical is drawn as the original image data. In FIG. 8A, the range which is surrounded by a thick border is the pixels through which the fine line segment SL passes. In contrast to this, the result of the provisional dither where the dither mask 61 is applied is as shown in FIG. 8C when it is provisionally determined that each of the thresholds THn_d which correspond to the dither mask 61 have the values which are shown in FIG. 8B. During the provisional dither processing, the gradation values of each of the pixels according to the line segment SL are determined according to the ratio at which the line segment passes through each of the pixels. Accordingly, the gradation values according to the line segment for each of the pixels are different according to the ratio which is accounted for by the line segment with regard to the pixels, but the gradation values are provisionally determined to be values in a range of approximately 50 to 130. When the result of the provisional dither is reflected in ON/OFF of the dots, the determining that the dots are ON so as to correspond with the line segment SL is as in FIG. 8C. The dots are determined to be ON only in the pixels where the threshold of the dither mask 61 is 22. Since the error diffusion process where the second threshold THe is used is performed according to the results of the provisional dither in the present embodiment, the forming of dots is carried out by comparing with the high threshold THe_H according to the values of the focus pixel data Dn even when the result of the provisional dither is OFF (dots are not formed). In the results shown in FIG. 8D, it is determined by the error diffusion process that dots are formed even for pixels where the first threshold THn_d is a value of 58, 127, or 136 using the error distribution process.

In other words, it is difficult for there to be problems with regard to the fine lines not being displayed or being interrupted due to the dither method. At this time, the halftone processes shown in FIG. 3 do not make any determination at all about whether the target of the process is a natural image such as a line diagram or a photograph. Accordingly, simply by carrying out the same halftone process (FIG. 3), it is possible to appropriately display a line drawing by using the error diffusion method to compensate for the dots which are lost in the process due to the dither method in a region which is a line drawing and it is possible to generate dots using characteristics (for example, the blue noise characteristic) of the dither mask 61 using the dither method in the region which is a natural image even when provisionally moving without any changes from a region which is a line diagram to a region which is a natural image or when there is a line drawing in a natural image. As a result, it is possible to maintain sufficient image quality which includes graininess in bidirectional printing even with a natural image.

In addition, since a value which increases according to the gradation value of the focus pixel data is used as the threshold (the high threshold THe_H) which is used in the error diffusion method as shown in FIG. 6, phenomena such as tailing as described in Japanese Patent No. 3360391 do not occur in the present embodiment. Furthermore, by performing a process of switching the error diffusion range shown in FIG. 7 according to the gradation value of the focus pixel data, it is possible to expect a further improvement in image quality. Since the method of performing the error diffusion while switching the diffusion range is a well-known technique, detailed description will be omitted, but when the error diffusion range is switched according to the combination of the input gradation value and the binarization result, it is possible to improve graininess of low gradation regions and suppress generation of continuous dots which are undesirable, so-called worms, by carrying out error diffusion in a wide range only when the dots are ON at a low gradation value.

Examples of the advantages of the elements of the dither method on the high gradation side include the point that it is possible to suppress deterioration in image quality due to, for example, deviation in dot landing positions. This advantage is due to the predetermined characteristics of the forming of dots using the dither mask 61 described above. Here, it is difficult for the graininess of the printing image quality to stand out due to bleeding of the ink and the graininess does not become a problem even when dot data is generated using the dither method in high gradation regions.

B. Second Embodiment

Figure 9:
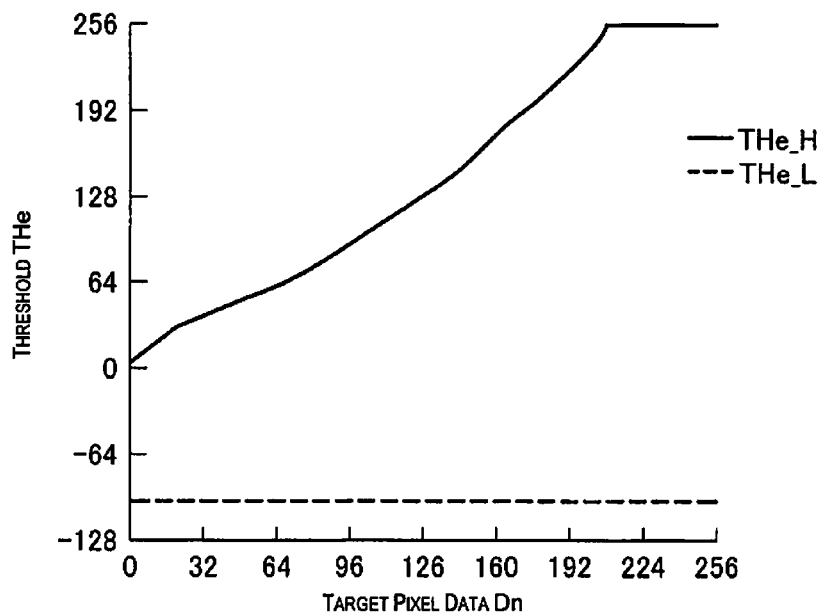
FIG. 9 is a graph illustrating the relationship between thresholds in the error diffusion process in a second embodiment and the target pixel data Dn.

Next, a second embodiment of the present invention will be described. The printer 20 of the second embodiment is provided with the same hardware configuration as the first embodiment and executes the same printing process (FIG. 2) and the same halftone process (FIG. 3). The printer 20 of the second embodiment differs from the first embodiment in the value of the second threshold THe. FIG. 9 is a graph illustrating the second threshold THe which is used in the second embodiment. As shown in the diagram, the value of the high threshold THe_H with regard to the gradation of the focus pixel data is different for the second threshold THe in the second embodiment compared with the first embodiment. The low threshold THe_L is set to −100 which is a negative value in the same manner as the first embodiment.

In the second embodiment, the same processes as the first embodiment are carried out, but the high threshold THe_H is set to a value which is smaller than in the first embodiment when the gradation value of the focus pixel data Dn is equal to or less than 96, and on the other hand, the high threshold THe_H is set to a value which is larger than the first embodiment when the gradation value of the focus pixel data is equal to or more than 128 and is set to the maximum value of 255 when the gradation value is equal to or more than 210. As a result, it is easy for the determination in step S136 to be "YES" in the low gradation area in the halftone process shown in FIG. 3 and it is easier for the dots to be formed. In addition, it is easy for the determination in step S136 to be "NO" in the medium and high gradation areas and it is difficult for the dots to be formed. As a result, not only is it possible to realize excellent line segments, but it is possible to emphasize edges. In addition, the forming of dots which substantially reflects the characteristics of the dither mask 61 is possible in regions other than where there are line segments or edges.

C. Third Embodiment

Figure 10:
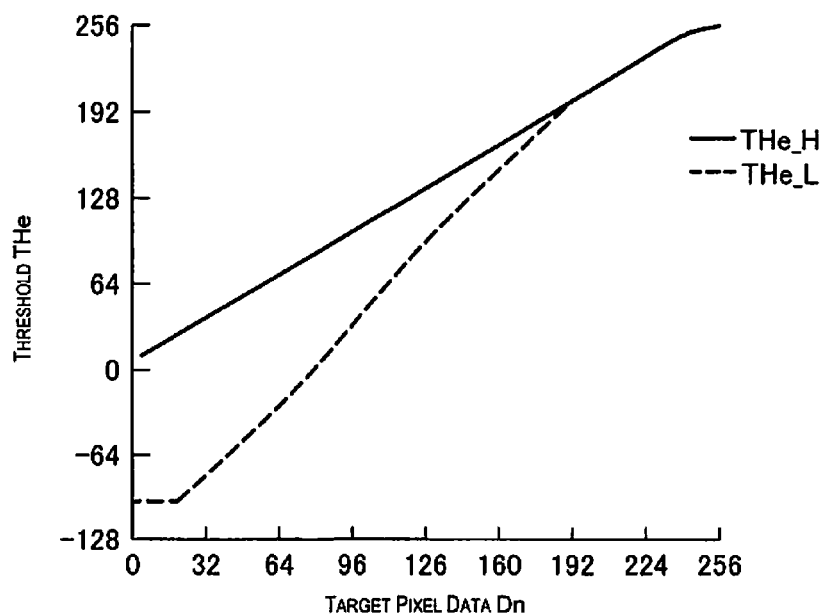
FIG. 10 is a graph illustrating the relationship between thresholds in the error diffusion process in a third embodiment and the target pixel data Dn.

Next, a third embodiment of the present invention will be described. The printer 20 of the third embodiment is provided with the same hardware configuration as the first embodiment and executes the same printing process (FIG. 2) and the same halftone process (FIG. 3). The printer 20 of the third embodiment differs from the first embodiment in the value of the second threshold THe. FIG. 10 is a graph illustrating the second threshold THe which is used in the third embodiment. As shown in the diagram, with regard to the second threshold THe in the third embodiment compared with the first embodiment, the value of the high threshold THe_H with regard to the gradation of the focus pixel data is the same as the first embodiment while the low threshold THe_L is different to the first embodiment. As shown in the diagram, the low threshold THe_L in the third embodiment is set to −100 which is a negative value in the same manner as the first embodiment when the focus pixel data Dn is a gradation value of equal to or less than 16, but the low threshold THe_L gradually increases when the gradation value is equal to or more than 16, and the low threshold THe_L is the same value as the high threshold THe_H when the gradation value is equal to or more than 192.

In the third embodiment, the same processes as in the first and second embodiments are carried out, but as a result of setting the low threshold THe_L as described above, it is possible to express the line segments while being substantially dither compatible when the gradation value is equal to or less than 16, and it is possible to realize the characteristic of substantial dither compatibility when the gradation value is equal to or more than 192 in the halftone process shown in FIG. 3. In addition, since the region where the gradation value is low, in other words, the vicinity of a highlighted edge, is dither compatible in the present embodiment, it is possible to sufficiently secure dispersibility of the highlight portion by using the dither mask 61 which is provided with the blue noise characteristic. There is a problem with normal error diffusion with dot dispersibility in a highlight section, and it is necessary to take complicated measures in order to improve this such as using an error diffusion mask with a large size only for the highlight section, but such measures are not necessary in the present embodiment. In addition, when using a dither which has a regular pattern such as a Bayer dither in the dither method, dots are generated according to a regular pattern dither where the dots do not stand out in the low gradation region where it is easy for dots to be recognized, and it is possible to realize a halftone process where switching of error diffusion methods is carried out to where it may be said that resolution and gradation reproducibility are superior in the medium and high gradation regions where it is not easy for dots to be recognized.

In the present embodiment, it is possible to further control the ratio between the dots which are determined as ON by the provisional dither and the dots which are finally formed according to the value of the low threshold THe_L. An actual halftone process is performed such that the value of the low threshold THe_L is reduced in a case where the ratio of the ON dots, where the result of the provisional dither matches the final result of the forming of dots, is smaller than the desired ratio and the value of the low threshold THe_L increases in the converse case where the ratio described above is larger than the desired ratio, and it is possible to determine the value of the low threshold THe_L where the desired generation ratio is obtained by gradual convergence of the value of the low threshold THe_L by repeatedly performing the halftone process.

D. Fourth Embodiment

Figure 11:
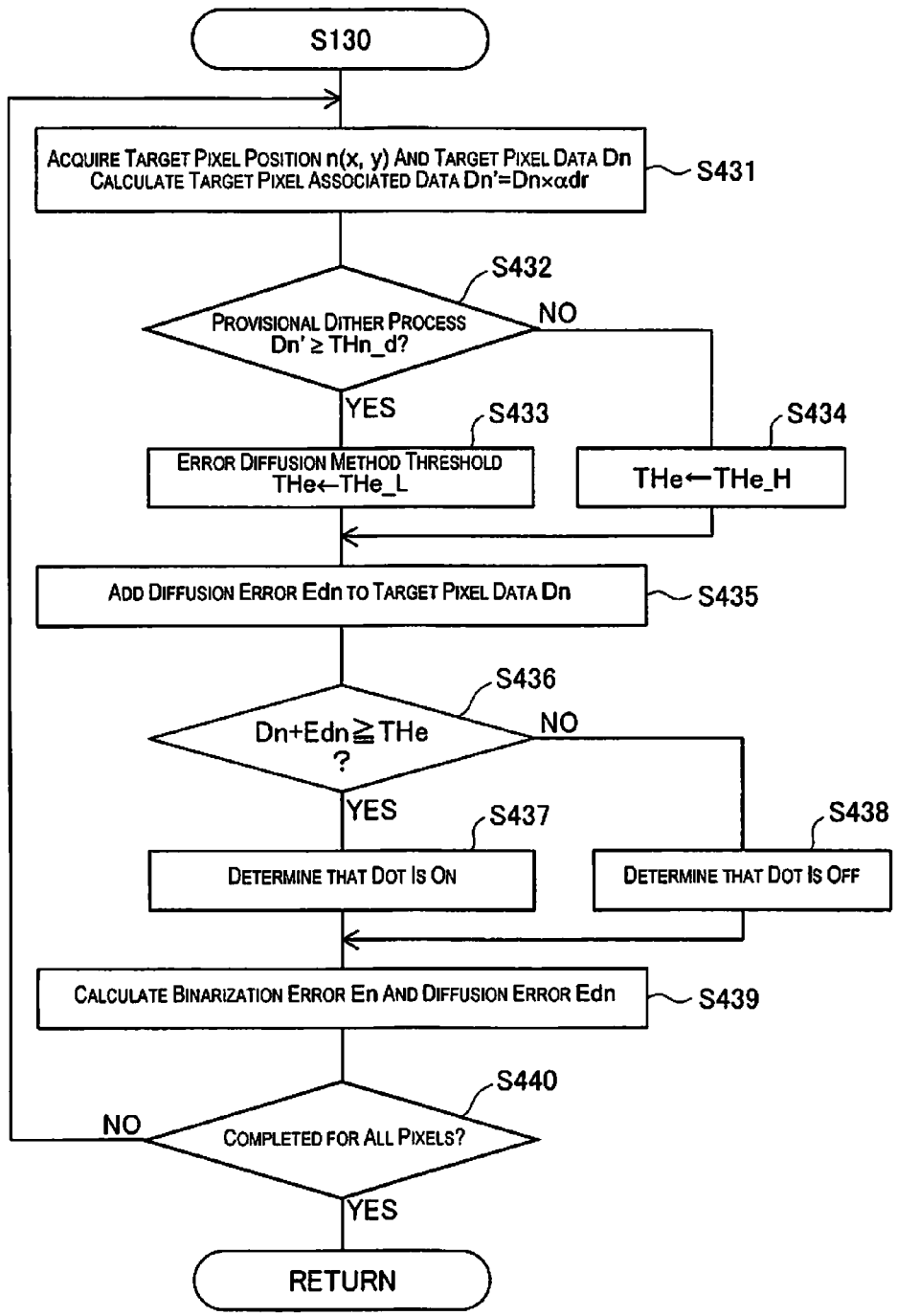
FIG. 11 is a flow chart exemplifying a halftone process in a fourth embodiment.

Next, a fourth embodiment of the present invention will be described. The printer 20 of the fourth embodiment is provided with the same hardware configuration as the first embodiment and executes the same printing process (FIG. 2). The printer 20 of the fourth embodiment differs from the first embodiment in the halftone process. The halftone process which is executed by the printer 20 of the fourth embodiment is shown in FIG. 11. The halftone process which is executed by the printer 20 of the fourth embodiment is different only in steps S431 and S432 which will be described later compared with the first embodiment, and the other steps S433 to S440 are the same as steps S133 to S140 of the first embodiment.

In the fourth embodiment, when the halftone process is started, the CPU 40 initially acquires coordinate data n(x, y) of the target pixel position and target pixel data Dn, and then performs a process of determining a value Dn' where the gradation value of the target pixel data Dn is multiplied with a predetermined coefficient αdr (0<αdr≤1) (step S431). Since the data which is calculated in this manner is the gradation value which is associated with the gradation value of the target pixel data Dn, the data may be referred to as associated data Dn' (Dn'=Dn×αdr). In the present embodiment, the coefficient α is equal to 0.9.

When calculating the associated data Dn', the CPU 40 performs the provisional dither process as the process of the comparing section 43 (step S432). The difference with the provisional dither process in step S132 shown in FIG. 3 is the point that the associated data Dn' and the threshold THn_d are compared instead of comparing the gradation value of the target pixel data Dn and the threshold THn_d of the dither mask 61.

As a result, if the associated data Dn' is equal to or more than the value of the threshold THn_d (step S432: YES), the threshold THe which is used in the error diffusion method is set to the low threshold THe_L (step S433). On the other hand, if the associated data Dn' is less than the value of the threshold THn_d (step S432: NO), the threshold THe which is used in the error diffusion method is set to the high threshold THe_H (step S434). Since the subsequent processes (steps S435 to S439) of the error diffusion method are the same as the first embodiment, description will be omitted. Here, determining ON/OFF of the dots in the error diffusion method is performed using the gradation value of the target pixel data Dn and not the associated data Dn'.

In the present embodiment, since the coefficient αdr is equal to 0.9, the ratio which determines if the dots are generated according to determining using the provisional dither is suppressed to be 90% of normal determining such as in the first embodiment. As a result, the missing 10% is generated by determining (step S436) using the error diffusion method. According to this, it is possible to arbitrarily set the ratio of the dots which are generated by determining according to the dither and the dots which are generated by determining according to the error diffusion method in a form which complements the dots which are generated by determining according to the dither.

Since it is possible to arbitrarily set the coefficient αdr between 0 and 1.0, it is possible to appropriately set the total of the dots which are generated by determining according to the dither and the dots which are generated by determining according to the error diffusion method. For example, when the coefficient αdr is equal to 1, the fourth embodiment is the same as the first embodiment, but in this case, dots are generated according to the error diffusion method in a form of being added to the dots which are generated by determining according to the dither. Accordingly, in this case, there are cases where slightly more dots are formed compared to the density of the images in the prior art. In contrast to this, when the coefficient αdr is a value which is slightly smaller than 1.0 such as 0.9 as in the fourth embodiment, it is possible to generate the portion which is insufficient using determining according to the error diffusion method to an extent which is necessary and sufficient since the dots which are generated according to determining in the provisional dither are slightly reduced. It is possible to better match the gradation which is expressed by the dots which are generated in total with the gradation of the original image.

Furthermore, it is possible to set the ratio of the dots which are generated according to the dither to an arbitrary ratio according to the gradation value of the image when the coefficient αdr is set as a function of the focus pixel data Dn. When the default value of the coefficient αdr is 1 and there is a gradation value where generating of the dots is determined with a high ratio, it is possible to make the ratio of the dot generating more uniform by slightly reducing the coefficient αdr in the focus pixel data and the gradations in the vicinity of the focus pixel data. Here, in a case where the coefficient αdr changes according to the gradation value, it is more preferable when the ratio of the dot generating is smoothly changed by being gradually increased or gradually decreased.

E. Fifth Embodiment

Figure 12:
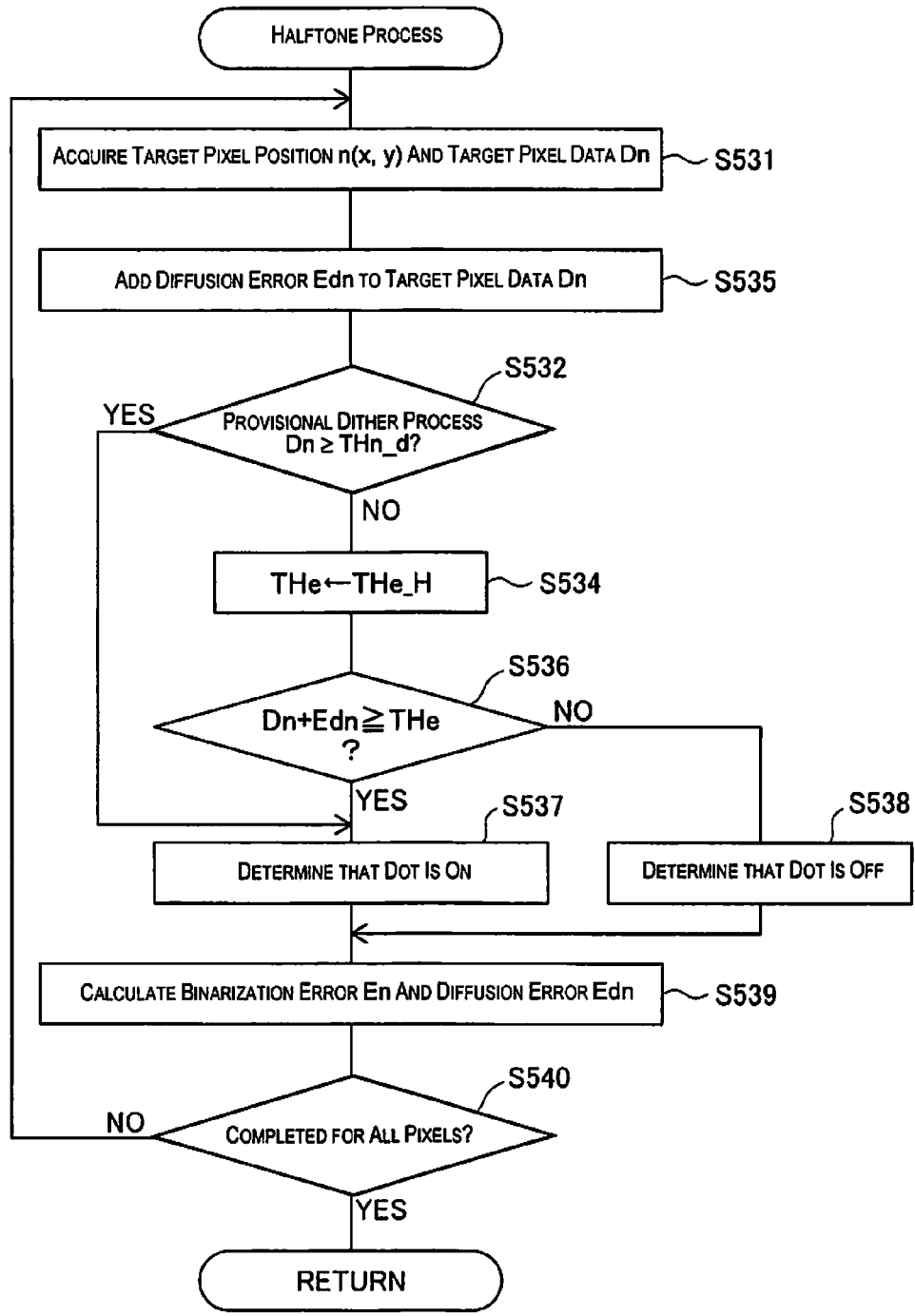
FIG. 12 is a flow chart exemplifying a halftone process in a fifth embodiment.

Next, a fifth embodiment of the present invention will be described. The printer 20 of the fifth embodiment is provided with the same hardware configuration as the first embodiment and executes the same printing process (FIG. 2). The printer 20 of the fifth embodiment differs from the first embodiment in the halftone process. The halftone process which is executed by the printer 20 of the fifth embodiment is shown in FIG. 12. The halftone process which is executed by the printer 20 of the fifth embodiment has substantially the same processes for each of the steps, but the order of the processes is different compared with the first embodiment. In FIG. 12, the last two digits of the steps are the same for the processes which are the same as in FIG. 3.

In the fifth embodiment, when the halftone process is started, the CPU 40 initially acquires coordinate data n(x, y) of the target pixel position and target pixel data Dn (step S531). Subsequently, the CPU 40 adds the diffused error Edn, which is stored in the error buffer which is prepared separately, to the gradation value of the target pixel data Dn (step S535). The diffused error Edn is calculated in step S539 which will be described later. The value where the diffused error Edn is added to the gradation value of the target pixel data Dn is also referred to as correction data in the same manner as other embodiments.

Subsequently, the provisional dither process is performed in the same manner as the first embodiment as the process of the comparing section 43 (step S532). The provisional dither process is a process of comparing the magnitude relationship of the gradation value of the target pixel data Dn and the value of the first threshold THn_d which corresponds to the coordinates (x, y) of the target pixel from out of the plurality of thresholds which configure the dither mask 61 which is stored in the EEPROM 60.

As a result of the provisional dither process, if the gradation value of the target pixel data Dn is less than the value of the threshold THn_d (step S532: NO), the second threshold THe which is used in the error diffusion method is set to the high threshold THe_H (step S534). Subsequently, the CPU 40 compares the correction data which is determined in step S535 and the threshold THe (step S536). As a result, when the correction data (Dn+Edn) is equal to or more than the threshold THe (step S536), it is determined that the dot of the target pixel is ON (a dot is formed) (step S537), and if the gradation value of the correction data is less than the threshold THe (step S536: NO), it is determined that the dot of the pixel of interest is OFF (a dot is not formed) (step S538).

On the other hand, in determining using the provisional dither in step S532, if the gradation value of the target pixel data Dn is equal to or more than the value of the threshold THn_D (step S532: YES), it is determined that the dot is ON (step S537) in the same manner as a case where the correction data (Dn+Edn) is equal to or more than the threshold THe (step S536: YES).

In this manner, when ON/OFF of the dots is determined, the CPU 40 calculates the binarization error En and the diffused error Edn (step S539). Since calculating of the binarization error En and the diffused error Edn was described in detail in the first embodiment, description will be omitted here.

When the binarization error En and the diffused error Edn are calculated, the CPU 40 determines whether the processes described above for all of the pixels are complete (step S540) and repeats the processes of step S531 to S539 described above while incrementing the target pixel position (x, y) until the processes for all of the pixels are complete.

According to the fifth embodiment described above, when the focus pixel data Dn is equal to or more than the dither threshold THn_d according to the process of the provisional dither, dots are formed without determining according to the error diffusion. Accordingly, a dot is always formed when the result of the provisional dither is ON. This is equivalent to setting a large negative value as the low threshold THe_L, for example, a value of negative infinity. As a result, according to determining using the provisional dither, it is possible to obtain a process result in the same manner as the case where the value of the low threshold THe_L is a value which is smaller than the lower limit of the range of the gradation values, and it is possible to achieve substantially the same operational effects as the first embodiment.

Above, as described using the first to fifth embodiments, an effect is achieved using the printer 20 of the present embodiment with the dither method as a starting point where the dots which are lacking are supplemented using the error diffusion method in fine lines and edge sections where dot generating according to the dither method is not sufficient. Moreover, it is possible to realize a halftone processing method which behaves as if the process is switched automatically according to the region without determining whether the region is a fine line or an edge. In addition, since it is possible to achieve both of the advantage of the dither method and the advantage of the error diffusion method which is superior in terms of reproducibility of line drawing for the same gradation values, it is not necessary to use trial and error to determine in what gradation area and to what extent to carry out switching from the error diffusion method, which is applied to the low gradation region where the line drawing reproduction is the main problem, to the dither method, which is applied to the medium and high gradation regions where graininess deterioration according to landing position deviation is the main problem. Accordingly, it is possible to avoid problems in the regions where the methods are switched, such as a reduction in the effects of each of the methods or deterioration in graininess.

F. MODIFIED EXAMPLES

F-1. Modified Example 1

In the embodiments described above, the value of the low threshold THe_L is −100 in the case where the focus pixel data Dn has a gradation value equal to or less than 16, but may be an even smaller value, for example, a value of −1000. This value may be determined experimentally such that the ratio of the dots which are generated according to the dither to the dots which are generated according to the error diffusion is a desired value. Here, it is sufficient if the value of the low threshold THe_L is less than the lower limit of the gradation range of the image to be halftone processed, and the value of −100 described above is an example of a value in a case where the focus pixel data Dn is interpreted as a value of 0 to 255 when expressed using 8 bits. In a case where the gradation range of the image to be halftone processed takes another expression format, it is sufficient to set a value which is less than the lower limit of the gradation range in that expression format.

F-2. Modified Example 2

In the embodiments described above, a blue noise mask whose characteristics are similar to error diffusion is used as the dither mask, but a dot dispersion ordered dither which has a regular pattern such as a Bayer dither may be used. In this case, it is possible to solve the biggest problem of the Bayer dither that "there are cases where lines disappear". In addition, it is effective because it is possible to eliminate problems such as that the lines at the halftone pitch are intermittent even when using a dot concentration type of dither such as a halftone dot dither or a green noise mask. This is because it is possible to realize a halftone where it is possible to reproduce without fine lines disappearing or being broken by using the error diffusion method in the fine line sections while using the dither pattern such as a Bayer, halftone, a green noise mask, or the like for a normal section which has a two dimensional spread.

F-3. Modified Example 3

In the fourth embodiment, when the coefficient αdr which is multiplied with the focus pixel data Dn is a function of the focus pixel data Dn, the coefficient αdr may be determined by reference to the look up table. In this manner, it is possible to freely set the coefficient αdr. The coefficient αdr may be changed by determining the type of the image (a line drawing, a natural image, or the like) and not only changed according to the gradation value of the image. The coefficient αdr may be set for each color of ink. In this manner, it is possible to change the ratio of the dots which are generated according to the dither and the dots which are generated according to the error diffusion for each ink in color printing. Furthermore, in a printer where it is possible to generate a plurality of types of ink droplets such as large, medium, and small, the coefficient αdr may be set for each of the types of dot in a case of adopting a configuration where a halftone process is carried out after calculating the ratio for generating dots for each type of dots from the gradation value according to a look up table or the like.

F-4. Modified Example 4

When applying the error diffusion method, the error diffusion range may be changed, for example, according to the result of determining using the provisional dither and not only appropriately changed according to the focus pixel data Dn. Alternatively, the result value RSLT in a case where the dots are to be formed may be changed according to the result of determining using the provisional dither. In a case where it is determined that the dots are ON according to the result of determining using the provisional dither, the diffused errors to be distributed are increased when the result value RSLT in a case where the dots are formed is a value which is larger than 255, and it is possible to suppress generating of dots in the vicinity and prevent the total number of dots from becoming excessive.

F-5. Modified Example 5

In the embodiments described above, a serial ink jet printer 20 is used as the printing apparatus, but the printing apparatus may be realized as another type of printer, for example, a page printer such as a line printer, or a laser printer. In addition, without being limited to a color printer, the printing apparatus may be realized as a printer for monochrome printing. Furthermore, without being limited to an ink jet printer, it is also possible to apply the present invention to various types of printers such as a thermal sublimation printer, a dot-impact printer, or the like.

In addition, it is also possible to apply the present invention to an image processing apparatus which performs only image processing. The halftone process which is exemplified in FIG. 3, FIG. 11, FIG. 12, and the like may be realized as a dedicated application program which is executed by a computer or may be realized in a dedicated apparatus such as an RiP. Alternatively, the present invention may be used by connecting a computer and a printer or a portion or all of the image processing may be executed within a printer driver. Furthermore, a dedicated server which performs image processing in this manner may be placed in a network and may be operated in a format where the image data is processed according to a request from another computer or a printer.

F-6. Modified Example 6

In the first to third embodiments described above, the low threshold THe_L is set to a value which is smaller than the range of the gradation values (0 to 256), here, a negative value, at least in the low gradation area. In the examples shown in FIG. 6 and FIG. 9, the low threshold THe_L is set to a value of approximately −100 with regard to all of the gradation values. In addition, in the example shown in FIG. 10, the low threshold The_L is set to −100 when the target pixel data Dn is 20/256 or less. In modified example 6, the low threshold THe_L is set as follows with regard to the target pixel data Dn.

(1) In a case where the target pixel data Dn is a value of 0, the low threshold THe_L is set to an arbitrary value other than 0.

(2) In a case where the target pixel data Dn is a value of 1/256 to 4/256, the low threshold THe_L is set to the same value as the high threshold THe_H in FIG. 6.

(3) When the target pixel data Dn is equal to or more than a value of 5/256, the low threshold THe_L is set to the same value as the low threshold THe_L in FIG. 6, FIG. 9, or FIG. 10.

In this manner, when the low threshold THe_L is set to the same value as the high threshold THe_H in FIG. 6, it is difficult to generate the operational effect according to each of the embodiments described above such that dots are actively formed according to the error diffusion so as to compensate for the lack of the dot forming according to the dither method in this gradation range in a case where the target pixel data Dn is a value of 1/256 to 4/256. However, in the gradation range where the dots are formed sparsely such as where the target pixel data Dn is a value is 0 to 4/256, the necessity of properly reproducing as an original line is low, and the effects of the graininess deterioration due to the landing position deviation during bidirectional printing are small. Accordingly, even when the low threshold THe_L is not a negative value in such a gradation range, it is possible to sufficiently exhibit the operational effects of the present invention outside this gradation range and this is preferable. Here, since there are few dots which are formed in the original, the effects will not stand out even when the low threshold THe_L is switched in this manner.

Each of the gradation values (1/256, 4/256, and 5/256), where the setting of [1] to [3] described above is performed, is not limited to the above description. Whether the setting of the value of the low threshold THe_L is changed to whatever value may, for example, be appropriately determined experimentally. The value of the low threshold THe_L may be set according to whether the effects of fine line reproducibility and edge emphasis are obtained in a certain gradation range. In addition, in the case of [1], in other words, since determining is not carried out regarding whether the dot is to be ON using determining according to the provisional dither in a case where the target pixel data Dn is a value of 0, the value of the low threshold THe_L may be set as the same value as the high threshold THe_H in FIG. 6. When the appropriate value is selected, determining of the forming of dots is carried out according to the error diffusion method. The value of the low threshold THe_L which is set in [2] may be a value which is lower than the high threshold THe_H in FIG. 6.

The present invention is not limited to the embodiments and modified examples described above, and it is possible for the present invention to be realized by various configurations within a scope which does not depart from the gist of the present invention. For example, it is possible for the technical features in the embodiments and modified examples which correspond to the technical features in each of the forms described in the section of the Summary of the Invention to be appropriately replaced or combined in order to solve some or all of the problems described above, or in order to achieve some or all of the effects described above. In addition, where the technical features are not described as essential in the present specification, it is possible to delete the technical features as appropriate.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A printing apparatus adapted to print an image based on image data, the printing apparatus comprising:
an input section where the image data is input;
a halftone processing section configured to generate dot data which represents whether or not dots are formed by processing the image data using an error diffusion method; and
a print section configured to perform printing of the image using the dot data which is generated,
wherein the halftone processing section includes
a comparator configured to compare a first threshold which is aligned with a dither mask and the image data which is input,
a threshold setting section configured to set a second threshold which is used in the error diffusion method to one of a low threshold and a high threshold whose values are different to each other according to results of the comparing, and to set the low threshold to a value which is smaller than a gradation range of the image data in at least a low gradation area in a case where it is determined that the image data exceeds the first threshold, and
an error diffusion section configured to generate the dot data and to calculate distribution to pixels in the vicinity of gradation errors, which are generated as a result of generating the dot data, by comparing correction data where error distribution in the image data is complete using the error diffusion method and the low threshold or the high threshold which is set.

2. The printing apparatus according to claim 1, wherein
the image data is values equal to or more than 0 which have a gradation range of at least n bits (where n is an integer of 4 or more),
the low threshold is a value of less than 0 in at least a predetermined range which is a low gradation area, and
the high threshold is a value within the gradation range.

3. The printing apparatus according to claim 2, wherein
the predetermined range is the low gradation area which includes at least a portion of a range of 13/256 to 26/256 on a low area side with regard to the gradation range.

4. The printing apparatus according to claim 2, wherein
the low threshold and the high threshold outside the low gradation area are each set as values according to the image data, and the low threshold and the high threshold are set to the same value in at least a range where the image data is equal to or more than 192/256 with regard to the gradation range.

5. The printing apparatus according to claim 1, wherein
the error diffusion section is configured to generate the dot data as data where the dots are formed without performing the setting of the low threshold or the comparing in a case where it is determined that the image data exceeds the first threshold as a result of the comparing by the comparator.

6. A printing method for printing an image based on image data, the printing method comprising:
inputting the image data;
setting a second threshold which is used in an error diffusion method to one of a low threshold and a high threshold whose values are different to each other by comparing a first threshold which is aligned with a dither mask and the image data, and setting the low threshold to a value which is smaller than a gradation range of the image data in at least a low gradation area in a case where it is determined that the image data exceeds the first threshold when dot data which represents whether or not dots are formed is generated from the image data by performing a halftone process according to the error diffusion method, and generating the dot data and calculating distribution of pixels in the vicinity of gradation errors, which are generated as a result of generating the dot data, by comparing correction data where error distribution in the image data is complete using the error diffusion method and the low threshold or the high threshold which is set; and
performing printing of the image using the dot data which is generated.

7. An image processing apparatus adapted to generate dot data which represents whether or not dots are formed by processing image data which represents a predetermined image, the image processing apparatus comprising:
an input section where the image data is input; and
a halftone processing section configured to generate the dot data by processing the image data using an error diffusion method,
wherein the halftone processing section includes
a comparator which compares a first threshold which is aligned with a dither mask and the image data which is input,
a threshold setting section configured to set a second threshold which is used in the error diffusion method to one of a low threshold and a high threshold whose values are different to each other according to results of the comparing, and to set the low threshold to a value which is smaller than a gradation range of the image data in at least a low gradation area in a case where it is determined that the image data exceeds the first threshold, and
an error diffusion section configured to generate the dot data and to calculate distribution to pixels in the vicinity of gradation errors, which are generated as a result of generating the dot data, by comparing correction data where error distribution in the image data is completed using the error diffusion method and the low threshold or the high threshold which is set.

* * * * *